(12) United States Patent
Nolte et al.

(10) Patent No.: US 11,088,499 B2
(45) Date of Patent: Aug. 10, 2021

(54) WEAR MEASURING SYSTEM AND METHOD

(71) Applicant: Schunk Bahn- und Industrietechnik GmbH, Wettenberg (DE)

(72) Inventors: Julian Nolte, Leun (DE); Robert Castellanos, Giessen (DE)

(73) Assignee: SCHUNK TRANSIT SYSTEMS GMBH, Wettenberg (DE)

( * ) Notice: Subject to any disclaimer, the term of this patent is extended or adjusted under 35 U.S.C. 154(b) by 118 days.

(21) Appl. No.: 16/394,538

(22) Filed: Apr. 25, 2019

(65) Prior Publication Data

US 2019/0334305 A1    Oct. 31, 2019

(30) Foreign Application Priority Data

Apr. 26, 2018  (DE) .................... 10 2018 110 098.1

(51) Int. Cl.
*H01R 39/58* (2006.01)
*G01B 5/28* (2006.01)
*F03D 9/25* (2016.01)

(52) U.S. Cl.
CPC ............... *H01R 39/58* (2013.01); *G01B 5/28* (2013.01); *F03D 9/25* (2016.05)

(58) Field of Classification Search
CPC ........ H01R 39/00; H01R 39/18; H01R 39/58; H01R 43/14; G01B 5/28
See application file for complete search history.

(56) References Cited

U.S. PATENT DOCUMENTS

| 4,841,800 A * | 6/1989 | Deffner ................... G05G 5/16 74/519 |
| 2014/0265675 A1* | 9/2014 | Cutsforth ............... H01R 39/58 310/73 |

FOREIGN PATENT DOCUMENTS

| DE | 4003669 A1 | 8/1990 |
| DE | 9212881 U1 | 11/1992 |
| DE | 10320236 A1 | 12/2004 |
| EP | 0360197 A2 | 3/1990 |
| WO | 2008102003 A2 | 8/2008 |
| WO | 2010000350 A1 | 1/2010 |

\* cited by examiner

*Primary Examiner* — Tran N Nguyen
(74) *Attorney, Agent, or Firm* — Quarles & Brady LLP

(57) ABSTRACT

The disclosure relates to a wear measuring system for friction elements, in particular for brushes and the like, as well as to a method for measuring the wear of friction elements, comprising at least one consumable friction element, a holding device for movably positioning the friction element relative to a friction surface, and a measuring device for determining a wear status of the friction element relative to a wear length of the friction element, wherein the measuring device has a potentiometer, wherein the potentiometer is mechanically coupled with the friction element in such a way that a movement by the friction element relative to the friction surface induces a movement by the potentiometer.

16 Claims, 3 Drawing Sheets

WEAR MEASURING SYSTEM AND METHOD

CROSS-REFERENCE TO RELATED APPLICATIONS

This application claims the benefit of German Patent Application German Patent Application no. 10 2018 110 098.1 filed Apr. 26, 2018, the entire contents of which is hereby incorporated herein by reference for all purposes.

BACKGROUND

The disclosure relates to a wear measuring system for friction elements, in particular for brushes and the like, as well as to a method for measuring the wear of friction elements, comprising at least one consumable friction element, a holding device for movably positioning the friction element relative to a friction surface, and a measuring device for determining a wear status of the friction element relative to a wear length of the friction element.

Friction elements, for example carbon brushes for electric motors and generators, friction linings for power transmission, brake linings and solid lubricant pieces, are basically always subjected to wear through abrasion of the friction element material. It is often desirable to replace the friction element already before a function-impairing wear limit has been reached. Wear measuring systems are routinely used for monitoring a wear status of friction elements. Known here are electrical contacts on friction elements, or even switches, which can signal when a wear limit has been reached.

DE 10 2007 009 423 A1 discloses such a wear measuring system. Since switches can only signal that a wear limit has been reached, it is not possible to actually measure a wear status or wear length of the friction element.

Further known is to provide friction elements with a transponder unit, which can wirelessly communicate with a transmitter/receiver unit, eliminating the need for a complicated wiring of the friction elements.

A known wear measuring system uses compressed air for measuring a wear length of a friction element, wherein a friction element arranged on a holding device releases openings as wear continues, from which compressed air can escape. A flow sensor is used to measure a flow intensity, and thus a length of the friction element or a wear length. The disadvantage here is that a compressed air source is always required.

A compressed air source cannot be provided at justifiable costs precisely when using friction elements on wind power generators, for example in the form of a brush, carbon brush or metal brush on a slip ring or commutator of the generator. Using switches, measurement transducers or sensors directly on the friction element is also problematic, since very high flows can flow over the friction element, depending on the load case or also owing to a failure of adjacent friction elements, which can trigger or interrupt a switching process or distort measured values. The wear measuring system in question must also be especially robust and reliable, since on a wind power generator it can be exposed to temperatures of −40° C. to +150° C. and contaminants through the deposition of brush dust. In addition, the installation space in a wind power generator is especially tight. Even so, it is desirable to always obtain current and accurate information about a still remaining wear length of the friction elements used on a wind power generator, since it then becomes easier to plan the maintenance of a wind power generator involving a replacement of friction elements.

SUMMARY

Therefore, the object of the present disclosure is to propose a wear measuring system and a method for measuring the wear of friction elements that makes it possible to cost-effectively and reliably measure the wear of friction elements.

This object is achieved by a wear measuring system with the features in claim 1, a wind power generator with the features in claim 14, and a method with the features in claim 15.

The wear measuring system according to the disclosure for friction elements, in particular for brushes or the like, comprises at least one consumable friction element, a holding device for movably positioning the friction element relative to a friction surface, and a measuring device for determining a wear status of the friction element relative to a wear length of the friction element, wherein the measuring device has a potentiometer, wherein the potentiometer is mechanically coupled with the friction elements in such a way that a movement by the friction element relative to the friction surface induces a movement of the potentiometer.

Because the friction element is connected with the potentiometer given a mechanical coupling, a movement by the friction element can be transferred to the potentiometer. For example, the potentiometer can be operated as a voltage divider, making it possible to measure the wear length of the friction element that actually remains as a function of the movement and the change in length of the friction element then associated therewith. The mechanical coupling then also makes it possible to position the potentiometer far enough away from the friction element that a measurement can be performed independently of the current flowing through the friction element or the potentiometer cannot be influenced by this current. In addition, potentiometers can be reliably used within larger temperature ranges, at especially low but also at especially high temperatures. The potentiometer can be a wire potentiometer, spiral potentiometer, layer potentiometer, trim potentiometer, multiple potentiometer or an electronic potentiometer. Because potentiometers are especially cost-effective and readily available, the measuring device can be configured at low costs.

The wear length of the friction element can be continuously measurable by the measuring device. As a consequence, the wear length can be determined relatively precisely in real time at any time during operation. For example, the wear length can be measured in a range of 0 to 100% of a possible wear of the friction element. A wear status, for example in the form of a percentage indication, can be determined as a function of a length indication. As a result, knowledge about a wear status of the friction element can be obtained at any time while operating a friction element, so that a replacement of the friction element can be planned in advance. As opposed to a switching pulse, the wear measuring system then delivers an operating parameter that relates to the friction element.

The potentiometer can advantageously be a rotary potentiometer. The difficulty with slide potentiometers basically involves effectively sealing them against penetrating contaminants. Rotary potentiometers can be activated by a rotatable shaft, which can be easily sealed against contaminants, for example brush dust, by means of a gasket. Therefore, a rotary potentiometer is comparatively robust, and can be used in a temperature range of −40° C. to +150°

C. In addition, potentiometers are available in sizes that do not significantly influence the overall dimensions of the holding device. For this reason, rotary potentiometers can also be advantageously used when the available overall dimensions are especially small, for example on a wind power generator.

The measuring device can have a shaft with lever arm mounted on the holding device, wherein the shaft can be coupled to the potentiometer and the lever arm can be coupled to the friction element, wherein the lever arm can be pivoted in the direction of the friction surface by a movement of the friction element, and the shaft can be rotated. The lever arm can be arranged on the shaft orthogonally relative to a longitudinal axis thereof, so that the movement of the lever arm can be converted directly into a rotation of the shaft. On its part, the rotation of the shaft can be converted directly or indirectly into a movement of the potentiometer or its activation by a mechanical coupling. The shaft and lever arm can together have a multipart or integral design. The shaft can also be mounted in a simple borehole in the holding device, wherein the lever arm then preferably extends in the direction of the friction element. The lever arm can then be mechanically coupled with the friction element in such a way as to transfer a movement by the friction element indirectly or directly to the lever arm as the result of a change in length.

An extension can be formed or arranged on the friction element, and acted upon by the lever arm. The lever arm can thereby be connected or contacted directly with the friction element.

The extension can consist of a metal sheet, and abut against one end of the lever arm. The metal sheet can itself be secured to the friction element with simple means, and on the friction element project from the latter transversely to a longitudinal axis of the friction element, for example, so that a movement along the longitudinal axis of the friction element induces a movement by the extension due to a change in length. The extension can then be fixedly connected with the end of the lever arm, or simply only abut against the end. The extension preferably abuts against the end relative to a direction of movement of the friction element directed toward the friction surface. As a result, the friction element can also be easily taken out of the holding device, without the lever arm having to be removed.

The lever arm can be positioned on the extension by means of a spring force exerted by a spring of the measuring device. As a result, it can be ensured that the lever arm will always loosely abut against the extension. The spring force or the force exerted by the lever arm on the extension must here always be comparatively smaller than a spring force of a spring of the holding device, which presses the friction element against the friction surface. For example, a spring of the holding device can be a coiled-strip spring or spiral spring. This makes it possible to prevent the friction element from being moved out of the holding device by the spring of the measuring device. At the same time, however, it can be ensured that the lever arm will always be in contact with the extension, so that a current position of the friction element can be measured.

A plurality of friction elements, preferably two friction elements, especially preferably four friction elements, can be arranged on the holding device, wherein all friction elements can be mechanically coupled with the measuring device. As a result, it then also becomes possible to monitor a number of friction elements simultaneously with a single measuring device. It here initially makes no difference whether a respective shaft, lever arm or potentiometer is provided for each friction element. In principle, however, it is also possible to monitor all friction elements with a shaft arranged along the series arrangement by means of a single potentiometer, depending on the arrangement of the friction elements on the holding device, for example given a series arrangement. The respective lever arms can be coupled to the accompanying friction elements in such a way that the respective smallest or shortest friction element causes the lever arm to be activated. In this way, it can be ensured that the wear length is monitored or measured based on the friction element that wears first. For example, the lever arm can also be constituted in such a way that all friction elements can activate a single lever arm, or that a specific lever arm is provided for each friction element.

The holding device can position the friction element on a periphery of the annular friction surface in a shared cross sectional plane, wherein at least two shafts can then be mounted on the holding device. As a consequence, the friction elements can be arranged sequentially in the peripheral direction of the friction surface, which can consist of a slip ring or commutator, wherein a shaft with a lever arm can then be provided for each friction element. The friction elements can also be paired in rows of several friction elements by means of the holding device.

The shafts can be interconnected via a gearbox of the measuring device, wherein one of the shafts can be coupled to the rotary potentiometer. By arranging the shafts with the respective lever arms, a measuring device with an especially small size can be designed with only one potentiometer. The gearbox can have a transmission ratio of 1:1, so that a movement by one shaft can be transferred directly to a movement by the other shaft. As a result, it is then sufficient that the rotary potentiometer be connected to only one of the shafts.

In particular, the gearbox can consist of a respective gearwheel arranged on the shaft, wherein the gearwheels then engage each other. The gearwheels can have a spur gearing.

The measuring device can have a processing device, by means of which the wear length can be determined. The processing device can consist of simple electronic components and/or comprise a data processing device. It can also be provided that the friction element be remotely monitored by means of the processing device. To this end, the processing device can be connected with a terminal for displaying measurement information via a connecting line, wireless connection techniques or the internet. In this way, it then also becomes possible to monitor friction elements in real time at locations that are especially difficult to access, for example in a nacelle of a wind turbine.

The processing device can be used to determine a partial voltage on the potentiometer, wherein an angular position of the lever arm can be determined from the partial voltage, wherein a length of the friction element can be determined from the angular position. For example, an analog-to-digital converter can be used to convert the measured analog voltage into a digital voltage. Since the properties of the potentiometer are generally known, a rotational angle position of the potentiometer that corresponds with the angular position of the lever arm can be determined from the digital voltage. Based on the geometry of the holding device and friction element, it then becomes possible to determine a length of the friction element from the angular position of the lever arm. In order to compensate for the influence of an ambient temperature, the measuring device can have a temperature sensor, which is arranged in the area of the holder or potentiometer. It can also be provided that a partial voltage be determined on the potentiometer for a new friction element and a worn friction element, and that these partial voltages each be stored, so that the wear length can be especially precisely calculated.

The wind power generator according to the disclosure comprises a wear measuring system according to the disclosure. Additional embodiments of a wind power generator may be gleaned from the feature descriptions in the subclaims referring back to claim 1.

In the method according to the disclosure for measuring the wear of friction elements, in particular brushes or the like, a holding device is used to movably position at least one consumable friction element relative to the friction surface, wherein a measuring device is used to determine a wear status of the friction element relative to a wear length of the friction element, wherein a movement by the friction element relative to the friction surface induces a movement by a potentiometer of the measuring device mechanically coupled with the friction element. Reference is made to the more detailed description of the wear measuring system according to the disclosure with regard to the special advantages to the wear measuring method. Additional advantageous embodiments of the method may be gleaned from the feature descriptions in the subclaims referring back to claim 1.

A preferred embodiment of the disclosure will be described in more detail below with reference to the attached drawings.

BRIEF DESCRIPTION OF THE DRAWINGS

Shown on.

DETAILED DESCRIPTION

Figure 1:
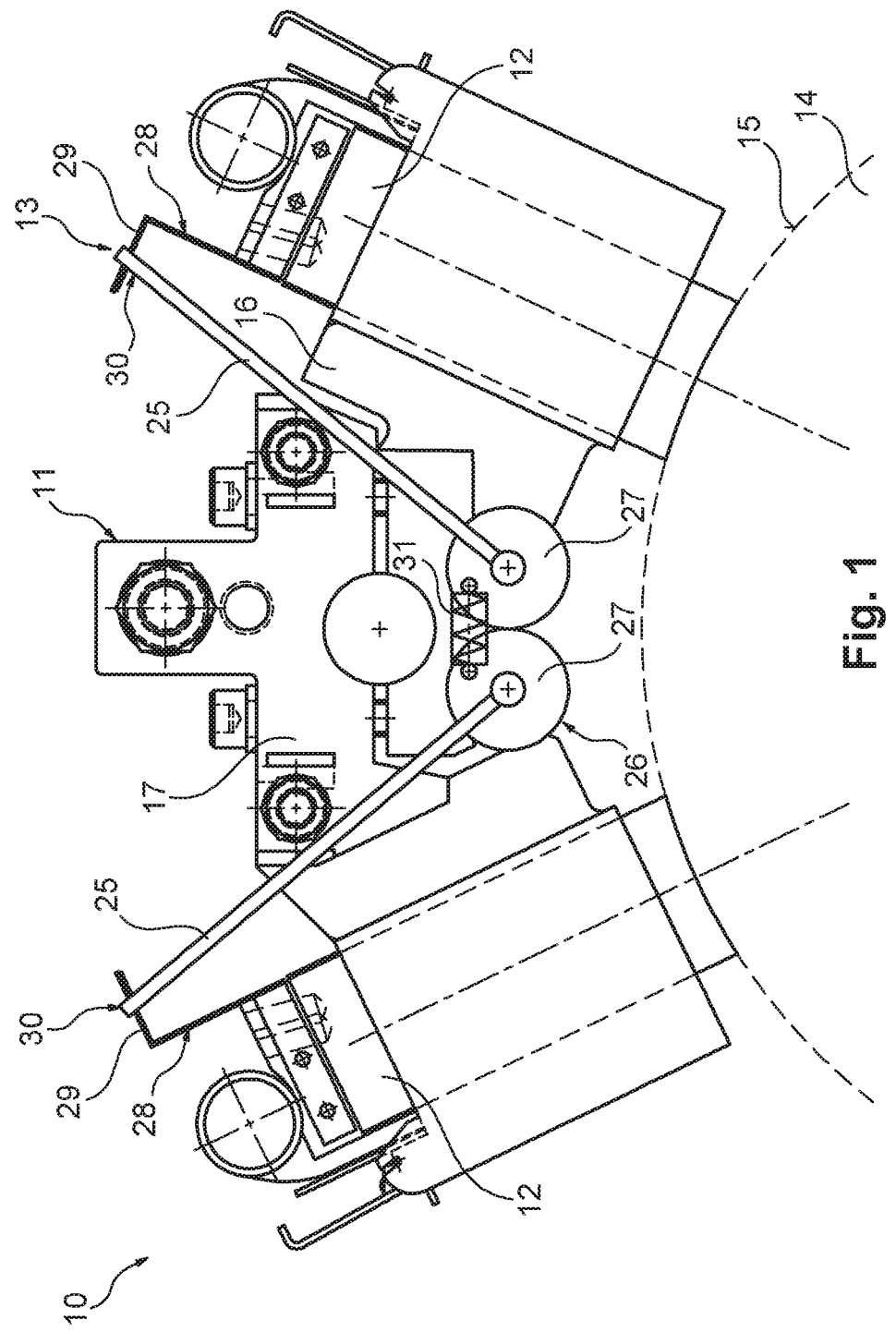
FIG. 1 is a front view of a wear measuring system.
Figure 2:
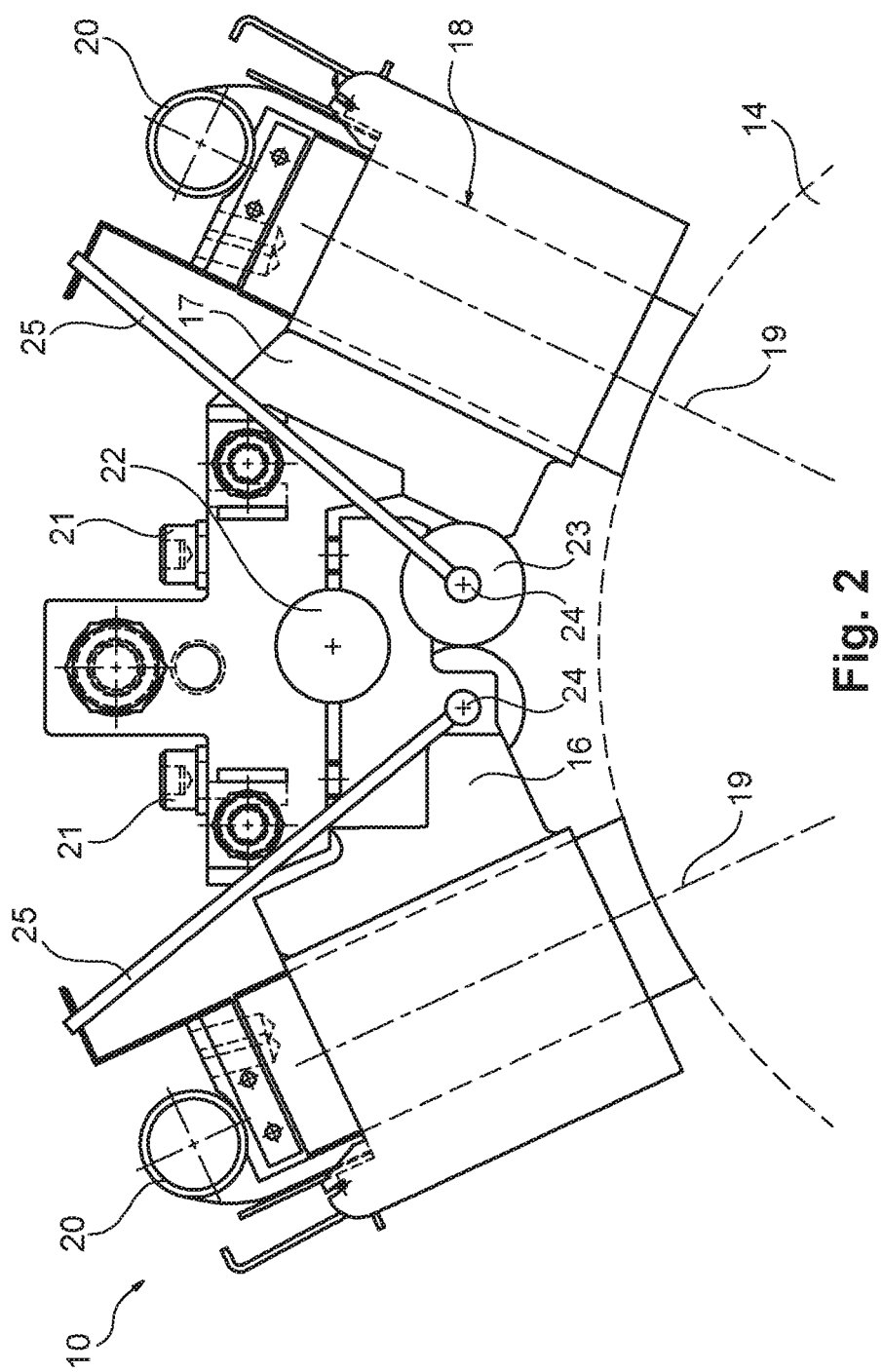
FIG. 2 is a rear view of the wear measuring system.
Figure 3:
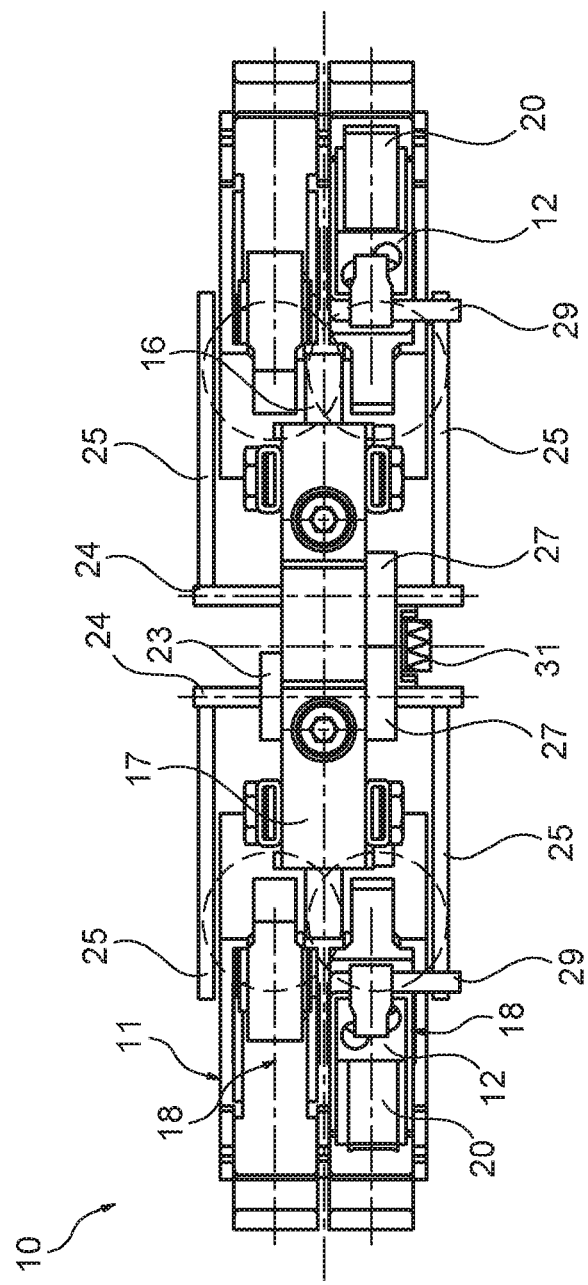
FIG. 3 is a top view of the wear measuring system.

A combined view of FIGS. 1 to 3 reveals a wear measuring system 10, comprising a holding device 11 for four friction elements 12 or brushes, as well as a measuring device 13 for determining a wear status of a friction element 12 relative to a wear length of the friction element 12. The wear measuring system 10 is arranged on a shaft 14 of a wind power generator (not shown in any more detail here), and the friction elements 12 contact a friction surface 15 of the shaft 14 for transmitting electrical energy via the friction elements 12. The holding device 11 consists of two holding elements 16 and 17, which each have shanks 18 for receiving the friction elements 12. The friction elements 12 are each placed into a shank 18, and can be moved along their respective longitudinal axis 19 toward the friction surface 15.

In particular, the friction elements 12 are pressed against the friction surface 15 with a spring force exerted by a coiled-strip spring 20. The holding elements 16 and 17 are connected with each other by screws 21, and clamped on a holding rod 22, so that the holding device 11 can be positioned on the holding rod 22 and aligned relative to the friction surface 15.

The measuring device 13 has a rotary potentiometer 23, which is mechanically coupled with the friction elements 12 in such a way that a movement by the friction element 12 relative to the friction surface 15 induces a movement by the rotary potentiometer 23. The measuring device 13 further comprises two shafts 24 mounted on the holding device 11, on which a respective lever arm 25 is arranged. One of the shafts 24 is coupled to the rotary potentiometer 23 or connected with the latter. The shafts 24 are further connected with each other via a gearbox 26 of the measuring device 13, wherein the gearbox 26 consists of two gearwheels 27, which are here only denoted schematically. The gearwheels 27 engage each other, so that a movement by one of the lever arms 25 or a pivoting of the latter causes the rotary potentiometer 23 to rotate. An extension 28 from the metal sheet 29 is formed on the respective friction elements 12, and secured to the friction element 12. The metal sheet 29 abuts against one end 30 of the respective lever arm 25, such that a movement by the friction element 12 in the direction of the friction surface 15 causes the metal sheet 29 to press against the end 30, and thus the lever arm 25 to pivot, owing to wear on the friction element 15. At the same time, the metal sheet 29 is only loosely connected with the lever arm 25, so that the friction element 12 can be easily removed from the shank 18.

A spring 31 of the measuring device 13 is here arranged on the gearwheels 27, and used to press the ends 30 of the lever arms 25 against the respective metal sheets 29, so that the shortest of the friction elements 12 is decisive for an inclination of all lever arms, and thus for a rotational angle position of the rotary potentiometer 23. The rotary potentiometer 23 has a hollow shaft (not shown here), through which the shaft 24 is passed. A total of four friction elements 12, of which two are depicted, can here be mounted on the holding device 11.

The invention claimed is:

1. A wear measuring system for friction elements, comprising at least one consumable friction element, a holding device for movably positioning the friction element relative to a friction surface, and a measuring device including a potentiometer for determining a wear status of the friction element relative to a wear length of the friction element, wherein an extension projects from the friction element transversely to a longitudinal axis of the friction element, the measuring device has a shaft with a lever arm mounted on the holding device, the shaft is coupled to the potentiometer and the lever arm is coupled to the extension projecting from the friction element, wherein the lever arm is pivoted by moving the friction element in the direction of the friction surface and the shaft is rotated in such a way that a movement by the friction element relative to the friction surface induces a movement of the potentiometer.

2. The wear measuring system according to claim 1, wherein the wear length of the friction element can be continuously measured by the measuring device.

3. The wear measuring system according to claim 1, wherein the potentiometer is a rotary potentiometer.

4. The wear measuring system according to claim 1, wherein the extension consists of a metal sheet and abuts against one end of the lever arm.

5. The wear measuring system according to claim 1, wherein the lever arm is positioned on the extension by a spring force exerted by a spring of the measuring device.

6. The wear measuring system according to claim 1, wherein a plurality of friction elements are arranged on the holding device, and wherein all friction elements are mechanically coupled with the measuring device.

7. The wear measuring system according to claim 6, wherein the holding device positions the friction elements on a periphery of the annular friction surface in a shared cross sectional plane, and wherein at least two shafts are mounted on the holding device.

8. The wear measuring system according to claim 7, wherein the shafts are connected with each other via a gearbox of the measuring device, and wherein one of the shafts is coupled to a rotary potentiometer.

9. The wear measuring system according to claim 8, wherein the gearbox is comprised of a respective gearwheel arranged on the shaft, and wherein the gearwheels engage each other.

10. The wear measuring system according to claim 1 wherein the measuring device has a processing device configured to determine the wear length.

11. The wear measuring system according to claim 10, wherein the processing device can be used to determine a partial voltage on the potentiometer, wherein an angular position of the lever arm can be determined from the partial voltage, wherein a length of the friction element can be determined from the angular position.

12. A wind power generator comprising a wearing measuring system according to claim 1.

13. A method for measuring the wear of friction elements, comprising the steps of:
   movably positioning at least one consumable friction element relative to a friction surface with a holding device,
   mounting a shaft with a lever arm on the holding device and coupling a potentiometer to the shaft to form a measuring device,
   coupling an extension projecting from the friction element transversely to a longitudinal axis of the friction element to the lever arm,
   inducing a movement by the friction element relative to the friction surface by moving the extension in the direction of the friction surface to pivot the lever arm and rotate the shaft inducing movement by the potentiometer of the measuring device, and
   determining a wear status of the friction element relative to a wear length of the friction element from the potentiometer in the measuring device.

14. The wear measuring system according to claim 6 wherein the plurality of friction elements comprises two friction elements.

15. The wear measuring system according to claim 6 wherein the plurality of friction elements comprises four friction elements.

16. The method of claim 13, wherein the friction elements are brushes.

* * * * *